United States Patent [19]

Jable et al.

[11] Patent Number: 4,502,707
[45] Date of Patent: Mar. 5, 1985

[54] TANDEM AXLE SUSPENSION SYSTEM

[75] Inventors: Roger D. Jable, Downers Grove; Alva R. Settle, Darien, both of Ill.

[73] Assignee: Boler Investments, Inc., Itasca, Ill.

[21] Appl. No.: 501,512

[22] Filed: Jun. 6, 1983

[51] Int. Cl.³ ............................................... B60G 11/10
[52] U.S. Cl. .................................. 280/682; 267/54 R; 267/56; 280/686
[58] Field of Search ............... 280/686, 682, 676, 104, 280/DIG. 1; 267/54 R, 56; 188/210

[56] References Cited

U.S. PATENT DOCUMENTS

| | | | |
|---|---|---|---|
| 3,365,190 | 1/1968 | Usalis | 267/54 R |
| 3,434,734 | 3/1969 | Poulos | 267/56 X |
| 3,841,652 | 10/1974 | Higginson | 267/54 X |
| 4,033,606 | 7/1977 | Ward et al. | 280/686 X |

*Primary Examiner*—Joseph F. Peters, Jr.
*Assistant Examiner*—Mitchell J. Hill
*Attorney, Agent, or Firm*—Lockwood, Alex, Fitzgibbon & Cummings

[57] ABSTRACT

A 4-spring, tandem axle suspension system comprising a pair of semi-elliptic compound leaf spring assemblies positioned on each side of the vehicle frame in fore-and-aft alignment. The remote ends of each pair of leaf springs are retained by engagement with front and rear brackets extending from the vehicle frame on each side, while the adjacent or proximate ends of the spring assemblies on each side are connected by means of a pair of shackles to opposing ends of an equalizer bar pivotally mounted on a bracket rigidly attached to the vehicle frame between the adjacent spring ends. Each inner or adjacent end of each spring assembly is pivotally attached to its shackles by means of a pivot bolt passing through a bushing and spring eye formed on the uppermost leaf of the spring assembly. A hook formed on the equalizer end of the second uppermost leaf of each multi-leaf spring assembly passes through an aperture provided in the adjacent shackle, and connects the shackle to the spring assembly in the event of failure of the spring eye or eye end of the main leaf, thereby preventing complete separation of each spring assembly from its shackle. This, in turn, prevents the freed end of the equalizer from damaging the adjacent torque rod in the case of the rear spring assembly, or prevents the broken section of the main spring leaf from damaging nearby chassis components such as air brake chambers in the case of the front spring assembly.

11 Claims, 3 Drawing Figures

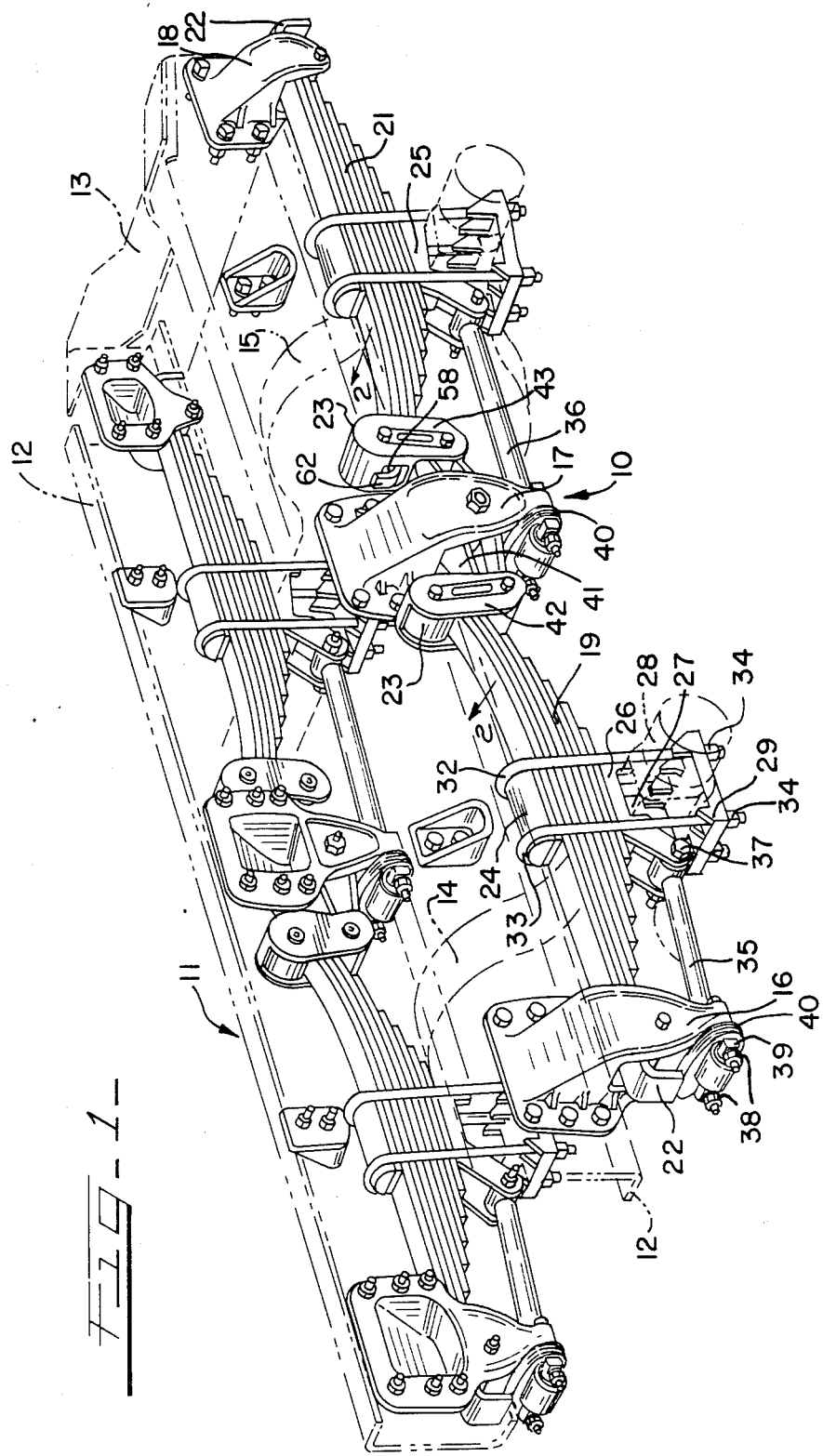

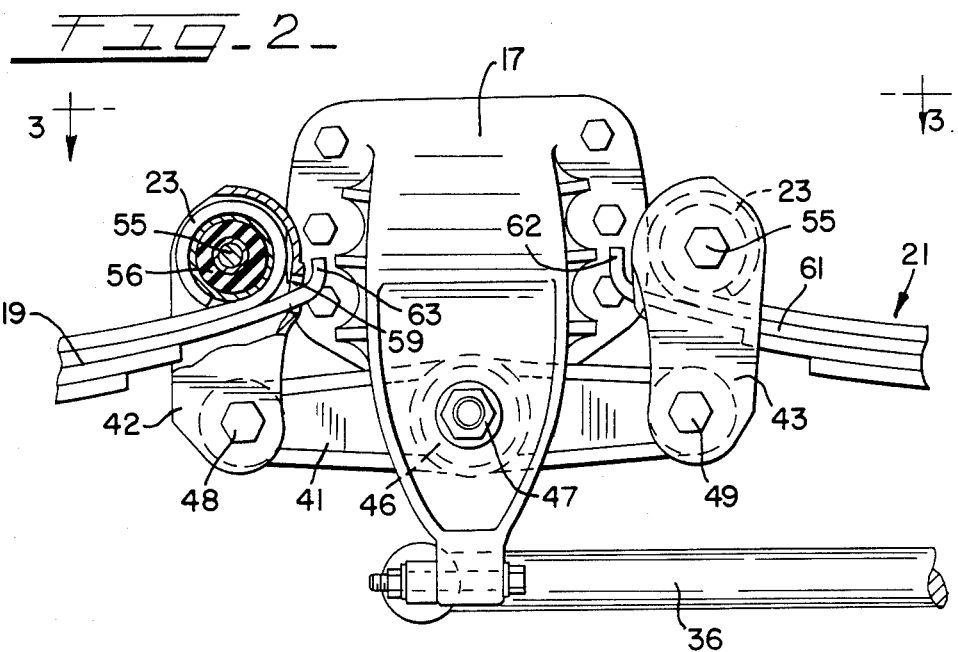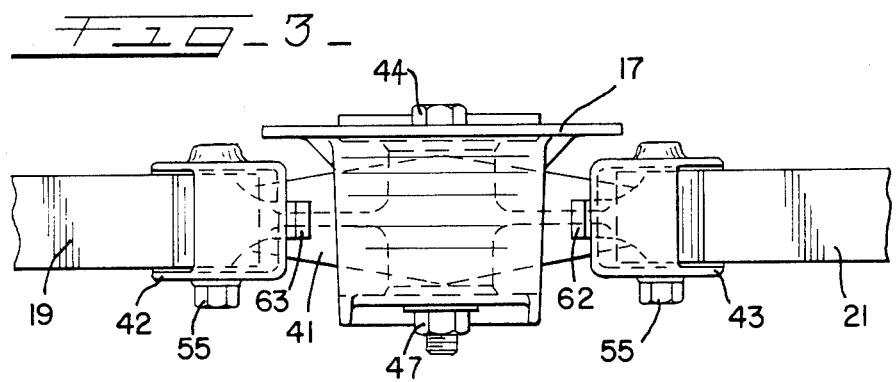

TANDEM AXLE SUSPENSION SYSTEM

This invention relates to vehicle suspension systems and, in particular, to improvements and innovations in 4-spring tandem axle suspensions for heavy duty trucks and trailers.

Several known types of 4-spring tandem axle suspensions have a pair of leaf spring assemblies positioned on each side of the chassis in fore-and-aft alignment with the inner or adjacent ends of the spring assemblies on each side being pivotally connected to shackles which are, in turn, pivotally connected to opposite ends of an equalizer bar. The pivotal connections between the inner or proximate ends of the leaf spring assemblies and the respective shackles are provided by bolts carried by the ends of the shackles and projecting through spring eyes formed on the ends of the uppermost or main leaf of each spring assembly. One 4-spring tandem axle suspension of this type is disclosed in U.S. Pat. No. 4,033,606 to Ward dated July 5, 1977. In one known design of a 4-spring tandem axle suspension of the foregoing type, the rear axle housing, or some portion thereof such as the seat on which the rear spring rests, is connected to a bracket which supports the equalizer bar by a torque rod. In a number of instances, the main leaf has failed near the spring eye. When such failure occurs, the shackle and section of spring at the eye are allowed to separate from the remainder of the spring assembly which, in turn, allows the end of the equalizer bar or rocker arm and section of spring which has become disconnected from the remainder of the spring assembly to drop down. In the event of a front spring failure, the broken section of the spring leaf still attached to the shackle can swing downward and damage other chassis components such as air brake chambers.

In the event of a rear spring failure, the equalizer can engage the radius rod with a pounding action. If this condition goes undetected while the vehicle continues to be driven, the radius rod can be damaged to the point of failure, allowing the axle connected thereto to come out from underneath the vehicle.

One known way of preventing such complete separation of the spring eye from the rest of the spring assembly has been to loosely wrap the end of the second leaf around the spring eye formed on the end of the uppermost or main leaf. The resulting double-wrapped eye has been referred to in the art as a "military wrap" or "safety eye". However, in certain suspensions, particularly in 4-spring tandem axle suspensions, there has been insufficient space available to use the double-wrapped spring eye safety feature without unduly increasing costs.

In accordance with the present invention, a means has been provided for solving the problem of spring main leaf failure in 4-spring tandem axle suspensions in a practical manner. The principal object of the present invention is, therefore, the provision of a suitable solution to this problem in a manner that provides adequate safety and yet is economical and does not require extensive modification of existing designs and equipment.

Briefly, the solution provided by the present invention is to form a hook on the end of the second leaf immediately below the eye on the main leaf of each spring assembly and have it project through an opening in each shackle connected to the spring. In the event a spring leaf fails in the vicinity of the eye, the hook will retain a connection between the end of the spring assembly and the shackle which will prevent the separation until repairs can be made.

For a more complete understanding of the nature and scope of the invention, reference may be made to the following description of a preferred embodiment taken in conjunction with the accompanying drawings, wherein:

FIG. 1 is a perspective view of a 4-spring tandem axle suspension system embodying the present invention shown in position on a vehicle frame indicated in broken line;

FIG. 2 is a fragmentary side elevational view taken on line 2—2 of FIG. 1 of a tandem axle load equalization mechanism; and FIG. 3 is a top plan view taken on line 3—3 of FIG. 2.

Referring to the drawings and, in particular, to FIG. 1, a 4-spring suspension assembly, indicated generally at 10 is shown installed on a vehicle frame 11. The vehicle frame 11 is represented by a pair of longitudinally extending side members 12 interconnected at their rear ends by a transverse crossmember 13. Forward and rear axle housings 14 and 15, respectively, extend in parallel alignment underneath the frame side members 12. In a tandem axle assembly of the type indicated in FIG. 1, it will be noted that the components of the assembly installed on one side of the frame will be duplicated on the opposite side of the frame. Consequently, the description which follows will be directed toward those components of the tandem axle suspension mounted on the left side of the vehicle frame, it being understood that the right side components of the suspension duplicate those of the left side.

The tandem axle assembly 10 includes a front bracket 16, an equalizer support bracket 17 and a rear bracket 18, each rigidly attached, in spaced linear arrangement, to the vertical outer face of the left frame side member 12. A front semi-elliptic compound leaf spring assembly 19 of known construction is disposed between the front bracket 16 and the equalizer support bracket 17. A corresponding rear leaf spring assembly 21 is disposed between the equalizer support bracket 17 and the rear bracket 18.

Each leaf spring assembly 19 and 21 comprises a plurality of flat metal leafs, of progressively increasing length, in vertical stacked arrangement so that the longest leaf is uppermost. Each uppermost or main leaf is provided at its remote end with a downwardly directed, substantially right-angle bend, forming a hook 22. At the other end, each uppermost leaf is coiled back upon itself to provide an eye 23 (FIG. 2). The front leaf spring assembly 19 is held together by a top pad 24 and a spring seat 26 (FIG. 1). The top pad 24 is shaped so as to intimately engage the upper surface of the uppermost leaf. The spring seat 26 is provided with an upper surface dimensioned so as to engage the bottom surface of the short lowermost leaf of spring 19. The top pad and spring seat 24 and 26, respectively, are secured to the spring leaf stack 19 at about the linear mid-point thereof. The underside of the spring seat 26 is provided with a notch 27 (FIG. 1) dimensioned so as to seat on the outer end 28 of forward axle housing 14. The outer end 28 is secured between the spring seat 26 and a bottom cap 29. The assembly is secured by two U-bolts 32, 33 each extending over a complimentary shaped upper surface provided on the top pad 24, and passing through suitable apertures in the bottom cap 29. Nuts 34 tension the U-bolts in order to rigidly lock the spring leafs to each other, and to the axle housing 14. It will be understood that the rear leaf spring assembly is rigidly affixed to the rear axle housing 15 in a similar manner.

In order to transfer to the frame 11 of the vehicle the large driving force generated through rotation of the driven wheels against the pavement, the tandem axle suspension is provided with rigid forward and rear radius rods 35 and 36, respectively. The forward radius rod 35 is disposed between the front bracket 16 and the front lower spring seat 26. The rear radius rod 36 is positioned between the equalizer support bracket 17 and the rear spring seat 25.

The forward end of forward radius rod 35 is pivotally attached to the front bracket 16 by means of a pin 39 extending through a bushing integrally formed on the end of the rod and secured by bolts and nuts 38. A bolt 37 extends through another bushing formed on the opposite end of the radius rod 35 to pivotally attach the radius rod 35 to the front of the spring seat 26. Because the radius rod 35 is pivotally attached at both ends, the forward axle 14 is able to move vertically with respect to the vehicle frame 11. Such vertical movement occurs when the vehicle is driven over rough or uneven roads. The rear radius rod 36 is pivotally attached between the equalizer support bracket 17 and the rear spring seat 25 in a corresponding manner.

Since the radius rods 35 and 36 are rigid and are disposed in a substantially horizontal position, longitudinal movement of the forward and rear axles 14 and 15 of the tandem axle assembly 10 with respect to the vehicle frame 11 is precluded. Shims 40 between the torque rod pin 39 and bracket 16 and 17 allow the longitudinal position of the torque rod to be variable over range. By changing the longitudinal position of the radius rods, the axles may be positioned to precise parallel alignment with one another, and to precise perpendicular alignment with the vehicle frame 11.

In order to equalize the loads borne by the front and rear leaf spring assemblies 19 and 21, the tandem axle assembly 10 is provided with a load equalization mechanism, the operation of which will be described with particular reference to FIGS. 2 and 3.

The load equalization mechanism includes a center equalizer bar 41, a front shackle 42, and a rear shackle 43. The center equalizer bar 41 is pivotally mounted to the equalizer support bracket 17, by means of a pivot bolt 44 extending through suitable apertures provided in both the equalizer support bracket 17, and the center equalizer bar 41. A cylindrical bushing 46 provides a bearing medium between the pivot bolt and the center equalizing bar. A nut 47 (FIG. 3) engages the threaded portion of pivot bolt 44 to secure the center equalizer bar 41 to the equalizer support bracket 17.

Front and rear shackles 42 and 43 are pivotally attached to the front and rear distal ends of the center equalizer bar 41 through cylindrical bushings. Pivot bolts 48 and 49 extend through apertures provided in the shackles and in the distal ends of the center equalizer bar and are secured into tapped bosses in the shackles. The upper end of the front shackle 42 is attached to the front leaf spring assembly 19 by means of pivot bolt 55 extending through the eye 23 provided in the uppermost leaf of the spring assembly 19. A cylindrical bushing 56 is provided between the pivot bolt 55 and the inner surface of the spring eye 23. The rear leaf spring assembly 21 is attached to the upper end of the rear shackle 43 in a similar manner.

In normal operation, the weight of the vehicle is supported by the upward forces exerted by the ends of the leaf spring assemblies 19 and 21 against the brackets 16, 17 and 18. When the load between the front and rear leaf spring assemblies 19 and 21 is properly equalized, the upward forces exerted by the adjacent ends of the springs, and hence the forces applied to the center equalizer bar 41 through shackles 42 and 43 are equal, resulting in the center equalizer bar 41 assuming a substantially horizontal position as indicated in FIG. 2. If the upward force exerted by the front spring assembly 19 were to suddenly increase as would occur, for example, when either or both of the forward tires of the tandem axle assembly pass over a discontinuity in the roadway surface, the center equalizer bar 41 will rotate so that its forward end moves upward and its rearward end moves downward and transmits the forces to the rear spring assembly 21. In this manner, the loads experienced by the front and rear springs 19 and 21 are equalized.

The eye end of the uppermost leaf of each leaf spring assembly is among the most highly stressed areas of the spring assembly and consequently is a potential site of spring failure. If an eye is the sole attaching point of a spring assembly to an associated shackle, the failure of the spring eye end of the main leaf may result in the spring becoming completely disengaged from its shackle. By reference to FIG. 2, it may be seen that in the event that one spring end becomes disengaged from its shackle while the other adjacent spring end remains under load, the unequal forces applied to the center equalizer bar 41 will result in unrestrained rotation of the bar. If the failure occurs in the eye end of the rear leaf spring 21, and if the rear leaf spring becomes completely disengaged from the rear shackle 43, the rearward end of the center equalizer bar 41 will rotate downward with considerable force until the bar 41 contacts the rear radius rod 36. When this occurs, the full load experienced by the eye end of the front leaf spring will be transferred to the radius rod which may, in turn, result in failure of the radius rod 36. Failure of the rod 36 may, in turn, lead to a shift in the position of the rear axle 15 (FIG. 1), which, in turn, may lead to a potentially serious loss of control of the vehicle. If the failure occurs in the eye end of the front leaf spring 19, and if the front leaf spring becomes completely disengaged from the front shackle 42, the broken portion of the spring at the eye end can, along with the shackle, rotate downward and damage other chassis components such as air brake chambers.

In order to prevent the leaf spring assemblies 19 and 21 from becoming totally disengaged from the shackles 42 and 43 in the event of a failure of the eye end of the main leaf 23, and in order to limit the rotation of the center equalization bar 41, secondary means for securing the adjacent ends of the spring assemblies 19 and 21 to the shackles 42 and 43, respectively, are provided. The rear shackle 43 is provided with an aperture 58 (FIG. 1) in the side facing the equalizer support bracket 17. A similar aperture 59 (FIG. 2) is provided in the front shackle 42 in the side facing the equalizer support bracket 17. The second uppermost leaf 61 of rear leaf spring assembly 21 is provided with an upwardly directed substantially right angle bend in order to form a hook 62 on the end of the leaf. A similar hook 63 is provided on the second uppermost leaf of the front leaf spring assembly 19. In normal operation, hooks 62 and 63 reside freely in the apertures 58 and 59 of rear and front shackles 43 and 42, respectively. In the event of failure of eye 23, the front and rear springs 19 and 21 are prevented from becoming totally disengaged from the front and rear shackles 42 and 43 by reason of hooks 63 and 62 engaging the shackles. The hook 62 provided in rear leaf spring 21 and the aperture 58 formed in rear shackle 43 limit the maximum possible downward rotation of the center equalizer bar 41, and are configured so that the center equalizer bar is precluded from rotating into contact with the rear radius rod 36. The hook 62 will secure the leaf spring assembly to the shackles until repair can be made to the uppermost leaf of the assembly. Because the secondary means for attaching the leaf spring assembly to the shackles comprises a hook passing through an aperture, less room is required to attach the leaf spring assembly to the shackle than would be the case if a conventional double wrapped eye was utilized.

What is claimed as new is:

1. In a tandem axle suspension for a vehicle having first and second compound leaf springs mounted in tandem one behind the other on each side of the vehicle, an equalizer bar pivotally mounted on an equalizer support bracket secured to the frame of the vehicle between the adjacent ends of the first and second springs, first and second shackle assemblies pivotally attached between the ends of the equalizer bar and the adjacent ends of said first and second springs respectively, and front and read radius rods positioned beneath the related springs, each of the radius rods having a rear end connected to its related axle and having a front end connected to a part secured to the frame of the vehicle, said rear radius rod being located in the path of rotation of the equalizer bar so as to be subject to contact by the equalizer bar upon unrestrained rotation thereof the improvement which comprises:

an aperture formed in said second shackle and a hook formed on the second uppermost leaf of said second leaf spring for engaging said aperture and preventing vertical separating displacement of said second shackle relative to said second leaf spring whereby unrestrained rotation of said equalizer bar into contact with the rear radius rod is prevented.

2. A tandem axle assembly according to claim 1 wherein an additional hook is formed on the second uppermost leaf of the first leaf spring at the end adjacent the equalizer bar and an additional aperture is formed in said first shackle for engaging said additional hook to prevent vertical separating displacement of said equalizer bar relative to said first leaf spring.

3. A tandem axle assembly according to claim 1 wherein said hook comprises an upwardly directed bend in said second uppermost leaf of said second leaf spring.

4. An improved tandem axle assembly of the type having first and second elongated compound leaf springs mounted in tandem one behind the other on each side of a vehicle, an equalizer beam pivotally mounted on an equalizer support bracket secured to the frame of the vehicle between the adjacent ends of the first and second springs, a first shackle assembly disposed between one end of the equalizer bar and the adjacent end of the first spring, first means including an eye formed at an end of the longest leaf of the first spring for pivotally attaching one end of said first shackle assembly to the adjacent end of the first spring, and second means, including an eye formed at an end of the longest leaf of the second spring for pivotally attaching one end of said second shackle assembly to the adjacent end of the second spring, the improvement which comprises, secondary means including an aperture in said first shackle, an additional hook in said second shackle, a hook formed on the second longest leaf of said first spring for engaging said aperture and an additional hook formed on the second longest leaf of said second spring for engaging said additional aperture, for attaching said first spring to said first shackle and for attaching said second spring to said second shackle whereby said secondary means remain engaged despite failure of the eyes in said first and second springs.

5. A tandem axle assembly according to claim 4 wherein said hook formed on said second longest leaf of said first leaf spring extends through said aperture formed in said first shackle and comprises an upwardly directed bend.

6. A tandem axle assembly according to claim 5 wherein said hook comprises a substantially right angle bend.

7. A tandem axle assembly according to claim 5, wherein said additional hook formed on said second longest leaf of said second leaf spring extends through said additional aperture formed in said second shackle and comprises an upwardly directed bend.

8. A tandem axle assembly according to claim 7, wherein said hook and said additional hook each comprise a substantially right angle bend.

9. A tandem axle assembly according to claim 2, wherein said additional hook comprises an upwardly directed bend in said second uppermost leaf of said first leaf spring.

10. A tandem axle assembly according to claim 3, wherein said hook forms a substantially right angle bend.

11. A tandem axle assembly according to claim 9, wherein said hook and said additional hook each comprise a substantially right angle bend.

* * * * *